Sept. 27, 1949.  W. H. KEIER  2,482,982
SAFETY STRIP
Filed Sept. 18, 1947

Inventor
William H. Keier
By
Geo E Kirk
Attorney

Patented Sept. 27, 1949

2,482,982

UNITED STATES PATENT OFFICE 2,482,982

SAFETY STRIP

William H. Keier, Toledo, Ohio

Application September 18, 1947, Serial No. 774,790

1 Claim. (Cl. 296—44)

This invention relates to avoidance of danger in motor vehicle driving arising from interference with visibility range. A transparent safety strip, readily attachable at ventilator windows, is not only an effective weather shed, but achieves such end without obstruction of vision.

This invention has utility when incorporated in a thin flexible transparent plastic strip of flat uniform thickness stock thruout. Preferably, the strip has a straight shorter edge for mounting or attachment, with extensions or overhangs therebeyond, which, with the intermediate or mounting portion dished or curved to provide an upwardly convex face, there is the carrying along thru the extensions of the general direction of the reinforcing tendency from the mounting curvature.

Referring to the drawings.

Figure 4:
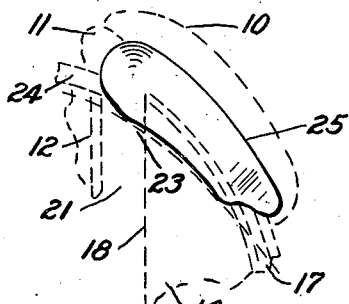
Fig. 4 is a fragmentary view from the outside from the rear looking somewhat upward at the right hand side front opened window, showing in full lines, and foreshortened, the shield in its operative position for the after portion of the window to swing outward clear thereof.
Figure 1:
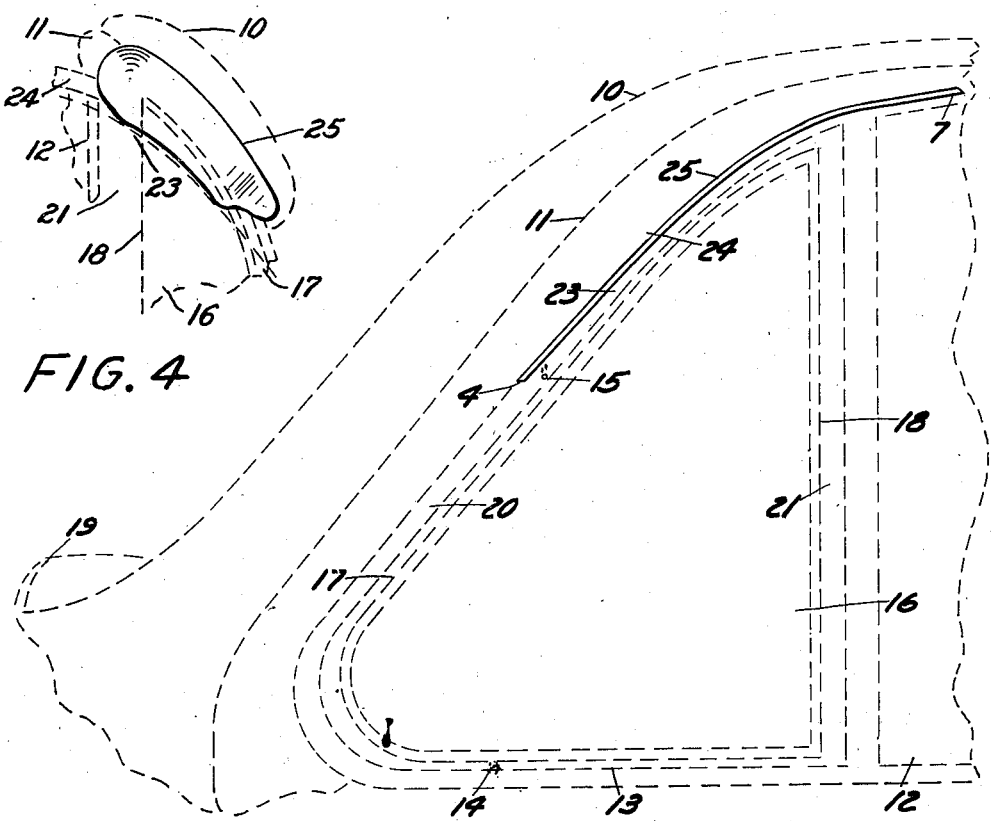
Fig. 1 is an edge view of one of the devices of the invention installed at the ventilator window section on the front left hand door of an automobile, normally directly adjacent the driver's seat, the motor vehicle structure being in dotted lines.
Figure 2:
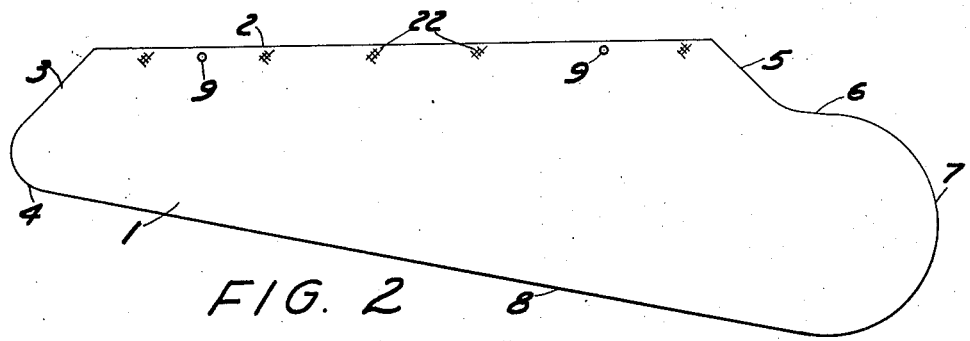
Fig. 2 is a view looking down upon the flat strip of the device of Fig. 1, in its form for ready installing.
Figure 3:
Fig. 3 is an edge view, on a smaller scale of the strip of Fig. 2.

An approximately uniform thickness flat stock or strip 1 has its bounding or straight mounting edge 2 lengthwise thereof. In the mounting of the transparent plastic safety strip 1 as a shield, from the lower forward end of the edge 2, there is an outward offset 3 of approximately 45°. In the practice hereunder in adapting to current motor vehicle ventilator windows, the edge 2 may be in the range of 5½", with the offset 3, say ⅝" long to a ⅜ radius drip extension portion 4.

Remote therefrom, and as installed at the upper rear end of the safety strip shield 1, there is an outward offset 5 at approximately 45° away from the line of the edge 2. The edge offset 5 may be say ¾" to a ¾" radius portion 6 terminating about 1 1/16" beyond the length of the edge 2. This upward extension is completed by a 1" radius semicircular edge 7 connected by a straight edge 8 with the edge 4. The bounds of the strip 1 are thus completed, and in the practice hereunder, are finished against any burr or rough portions. The strip may be as wide as 3".

Should the occasion be for screw mounting of the unit strip, holes 9 may be provided along the edge 2 for the mounting screws to clamp the strip 1 in shielding position at a ventilator window.

A closed body type of motor vehicle 10 is provided with a left hand side front door 11, having at its upper after portion a vertically slidable window 12. Forwardly therefrom is a space 13 where a vertically disposed pair of pivots 14, 15, mount a ventilator minor window portion 16. From within the vehicle controls or operating connections are provided for swinging the window 16 on the hinge or pivot mountings 14, 15, to have front edge 17 move inward and after portion 18 be thrust outwardly.

Upon opening a cowl ventilator 19, inflowing air to the car may pass outward thru a clearance 20 forward of the edge 17 as well as thru a clearance 21 rearward from the edge 18. It is thus to be seen that in fair weather driving, insects or objects in the air are subjected to an outdraft about the open window 16.

When the weather is inclement, in the absence of the shield herein, rain, sleet or snow, tends to blow into the car, thru the opening 20, which may be much to the annoyance of the occupants of the car. The normal course to cure this objectionable condition is to close the ventilator window 16. Under many driving experiences, this closing up of the car develops steaming on the windows to obscure vision. Such restriction of outview is a driving hazard.

Under tthe invention herein, the transparent safety strip 1 may have along its edge 2 a coating of adhesive 22. With the strip 1, say in the range of 1/16" in thickness, and of non-rigid plastic, it may be readily flexed to be slipped between a flexible or rubber packing portion 23 and metal facing mounting 24 therefor. Preferably this location as to the edge 2 for the strip 1, is from the pivot 15 to the top upper or rear corner of the clearance 21. That is, the strip 1 bridges the full extent of the region outward from which the after portion of the window 16 moves in opening. The adhesive 22 sets for establishing a firm mounting of the strip 1 into a convex upward face portion 25, with the extensions, both forwardly and rearwardly, taking the general direction of the anchored mounting and thus carrying both ways beyond the clearance 21.

With the vehicle at rest, the forward downward extension 4, directs drippings or run-off from the portion 25, outward and away from the door 11. If there be a strong forward wind toward the car, or in driving, snow, sleet or rain particles tend to ride upward along tthe convex face 25, and at the edge 5, as at the edge 3, are directed away from the door 11. With the speed of the car or relative blowing rate of the wind or storm sufficient to move the particles, they ride up the convex portion 25, pass out to the edge 7 and are discharged therefrom clear of the car. The curvature of the portion 25 may be in the range of a 16" radius, of rigidity as installed to hold up in normal vehicle use, with no restriction of outward viewing.

In practice, there is no occasion for rights and lefts of the strip 1, for it is alike on both sides and may be placed at either the right hand or left hand ventilator window of an automobile. Upon equipping the car by installing the shields of the strip 1, it is not necessary to close the ventilator windows 16 to keep out storm particles. The arched portion 25 is a complete and effective shield for the portion 21 against any indraft. The normal pitch direction of the partly open window 16 with its forward edge 17 inward, locates the plane of the window 16 as slanting rearwardly and outwardly past the pivot bearing 14 to the after edge 18. Should there be induced any indraft, the driver may open the cowl 19 sufficiently to neutralize such. There is thus possible full control of the car interior ventilation, regardless of the weather, and with full vision retained for safety in driving, due to the transparent shield 1.

What is claimed and it is desired to secure by Letters Patent is:

For a motor vehicle ventilator window having a vertical axis bearing, a frame mounting the bearing and forming an opening for the window, said opening having an inwardly concave top forward portion providing a seat, and packing for the window along the seat, the combination of a clear vision transparent plastic sheet safety strip, normally flat and flexible with a longitudinally extending edge, convex end edges, a strip-width-determining edge diverging from the longitudinally extending edge and terminally spaced therefrom by said convex end edges offset from the longitudinally extending edge, said flat strip being transversely stiffened by flexing and thrusting the longitudinally extending edge between the packing and the opening concave top portion clear of obstructing out-view from the vehicle interior, the convex edges, in their offset extent beyond the longitudinally extending edge, directing storm moisture downflow and upflow outwardly away from entering the opening.

WILLIAM H. KEIER.

REFERENCES CITED

The following references are of record in the file of this patent:

UNITED STATES PATENTS

| Number | Name | Date |
| --- | --- | --- |
| 2,108,322 | Thorp | Feb. 15, 1938 |
| 2,109,249 | Hickman | Feb. 22, 1938 |
| 2,281,840 | Hamilton | May 5, 1942 |